(12) United States Patent
Sugiyama et al.

(10) Patent No.: US 6,679,443 B2
(45) Date of Patent: Jan. 20, 2004

(54) GARBAGE DISPOSAL MACHINE

(76) Inventors: Toshie Sugiyama, c/o Nakapo World Inc., 1-4-2 Nakahara, Isogo-Ku, Yokohama-shi, Kanagawa Prefecture (JP), 235-0036; Hitoyoshi Kagami, c/o J Leading Corporation, 4-1-202, Ohomaru, Tuzuki-Ku, Yokohama-shi, Kanagawa Prefecture (JP), 224-0061

( * ) Notice: Subject to any disclaimer, the term of this patent is extended or adjusted under 35 U.S.C. 154(b) by 0 days.

(21) Appl. No.: 10/011,311

(22) Filed: Dec. 11, 2001

(65) Prior Publication Data
US 2002/0125355 A1 Sep. 12, 2002

(30) Foreign Application Priority Data
Mar. 12, 2001 (JP) ........................................ 2001-068129

(51) Int. Cl.[7] .............................................. B02C 19/12
(52) U.S. Cl. ................... 241/57; 241/65; 241/DIG. 38; 422/5; 422/122
(58) Field of Search .......................... 366/102; 422/122, 422/4, 5, 176, 177; 241/DIG. 38, 57, 18, 199.12, 23, 65

(56) References Cited

U.S. PATENT DOCUMENTS 5,925,321 A * 7/1999 Koyamoto et al. ......... 422/122

FOREIGN PATENT DOCUMENTS

| JP | 08-217581 | | 8/1996 |
| JP | 2000-180059 | | 6/2000 |
| JP | 2000-202411 | * | 7/2000 |

* cited by examiner

Primary Examiner—Mark Rosenbaum
(74) Attorney, Agent, or Firm—Jacobson Holman PLLC

(57) ABSTRACT

The present invention provides a garbage disposal machine and includes a body and a disposal tub installed in the body to put in garbage and garbage disposal materials that decompose the garbage. An agitator agitates the garbage and garbage disposal materials in the disposal tub. A warm air inductor induces warm air into the disposal tub, circulating the gas developed in the process of garbage decomposing in the disposal tub and sends the gas into the disposal tub. Part of the gas circulated by the warm air inductor is exhausted through an exhaust passage. The gas in the exhaust passage is deodorized and exhausted and ejected to the outside.

4 Claims, 15 Drawing Sheets

GARBAGE DISPOSAL MACHINE

BACKGROUND OF THE INVENTION

1. Field of the Invention

The present invention relates to a garbage disposal machine which may be utilized to decompose garbage discharged from house kitchens and the like using garbage disposal materials like wood chips and the like.

2. Discussion of the Background

In general, a garbage disposal machine commonly decomposes garbage by using garbage disposal materials. The garbage and garbage disposal materials, like wood chips and the like, are placed into a disposal tub. Inside the disposal tub, agitating blades are fixed. By rotating the agitating blades, the garbage and garbage disposal materials are agitated and garbage decomposition is accelerated.

A garbage disposal machine of the prior art, for example, is proposed in Japanese Patent Application Laid-Open No. 2000-180059. The apparatus has means for warming outdoor air aspirated to a chamber by a heater and fan, means for drying garbage by blowing such warm air to the garbage, means for passing the gas developed in the process of decomposing garbage through a container in which a deodorization accelerator is located, and means for exhausting the gas to the outside (hereinafter, this example is referred to as "Prior Art 1").

In addition, another garbage disposal machine of the prior art, for example, is proposed in Japanese Patent Application Laid-Open No. Heisei 8-217581. In this apparatus, its disposal tub is inclined 45 degrees toward the front side when garbage is put in. This also allows rotation of the disposal tub not less than 90 degrees when garbage is ejected (hereinafter, this example is referred to as "Prior Art 2")

In the case of Prior Art 1, the gas developed in the process of garbage decomposing is, without being reused, directly exhausted to the outside, which requires heating up low temperature air from outside, thus resulting in the problem of larger consumption of electric power.

Also in the case of Prior Art 2, the disposal tub cannot be adjusted to incline at the desirable angle, which may, depending on the application circumstance and the like, be inconvenient in putting in and exhausting garbage, and in cleaning up inside of the disposal tub.

The object of the present invention is to provide a garbage disposal machine, which allows saving electric power and to adjust the disposal tub to inline at the desirable angle, thus providing a solution to the aforementioned problems.

SUMMARY OF THE INVENTION

The present invention provides a garbage disposal machine and includes a body and a disposal tub installed in the body to put in garbage and garbage disposal materials that decompose the garbage. An agitator agitates the garbage and garbage disposal materials in the disposal tub. A warm air inductor induces warm air into the disposal tub, circulating the gas developed in the process of garbage decomposing in the disposal tub and sends the gas into the disposal tub. Part of the gas circulated by the warm air inductor is exhausted through an exhaust passage. The gas in the exhaust passage is deodorized and exhausted and ejected to the outside.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments of the present invention will hereinafter be described with reference to the accompanying drawings.

Figure 1:
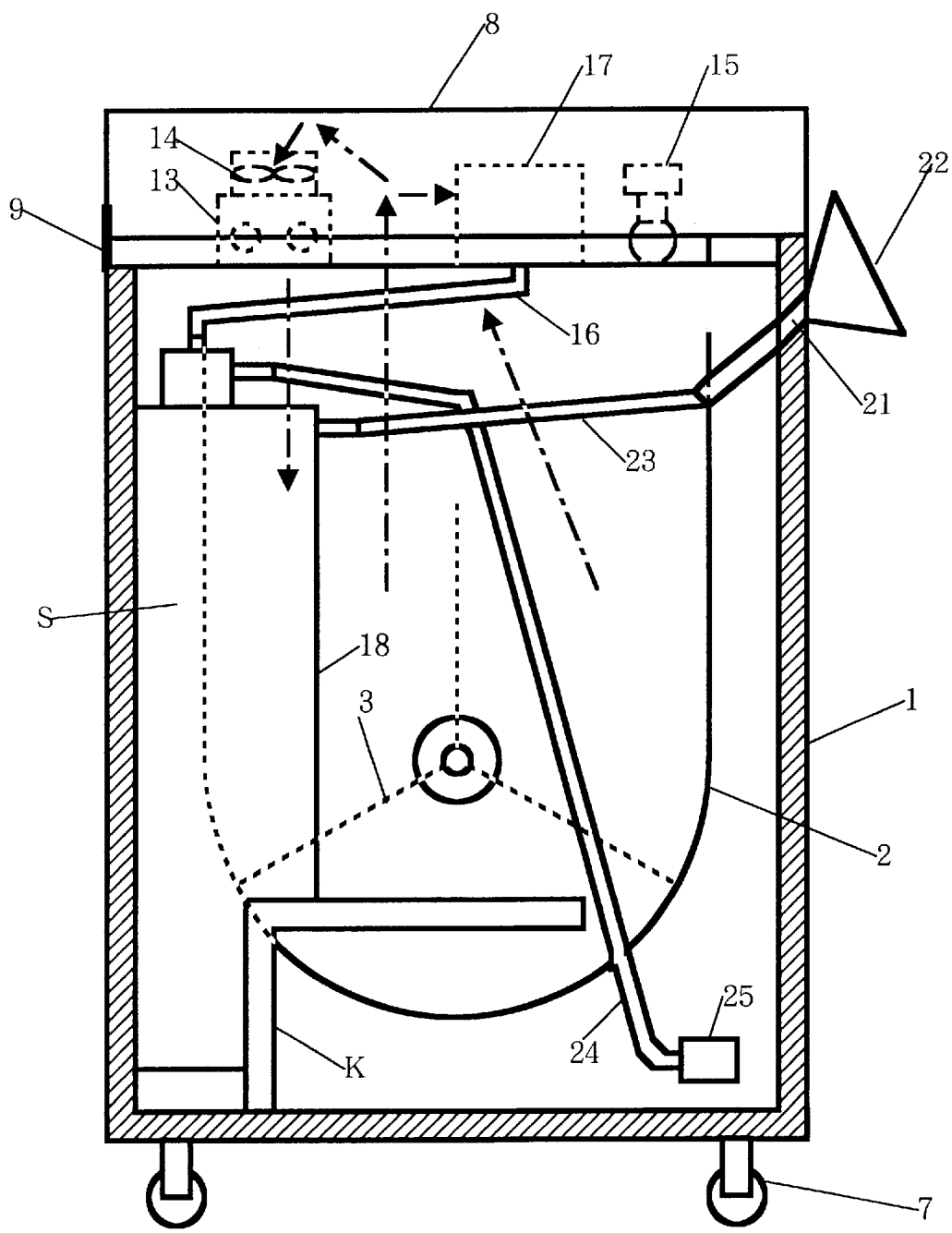
FIG. 1 is a side sectional view of the garbage disposal machine in accordance with a first embodiment of the present invention.
Figure 2:
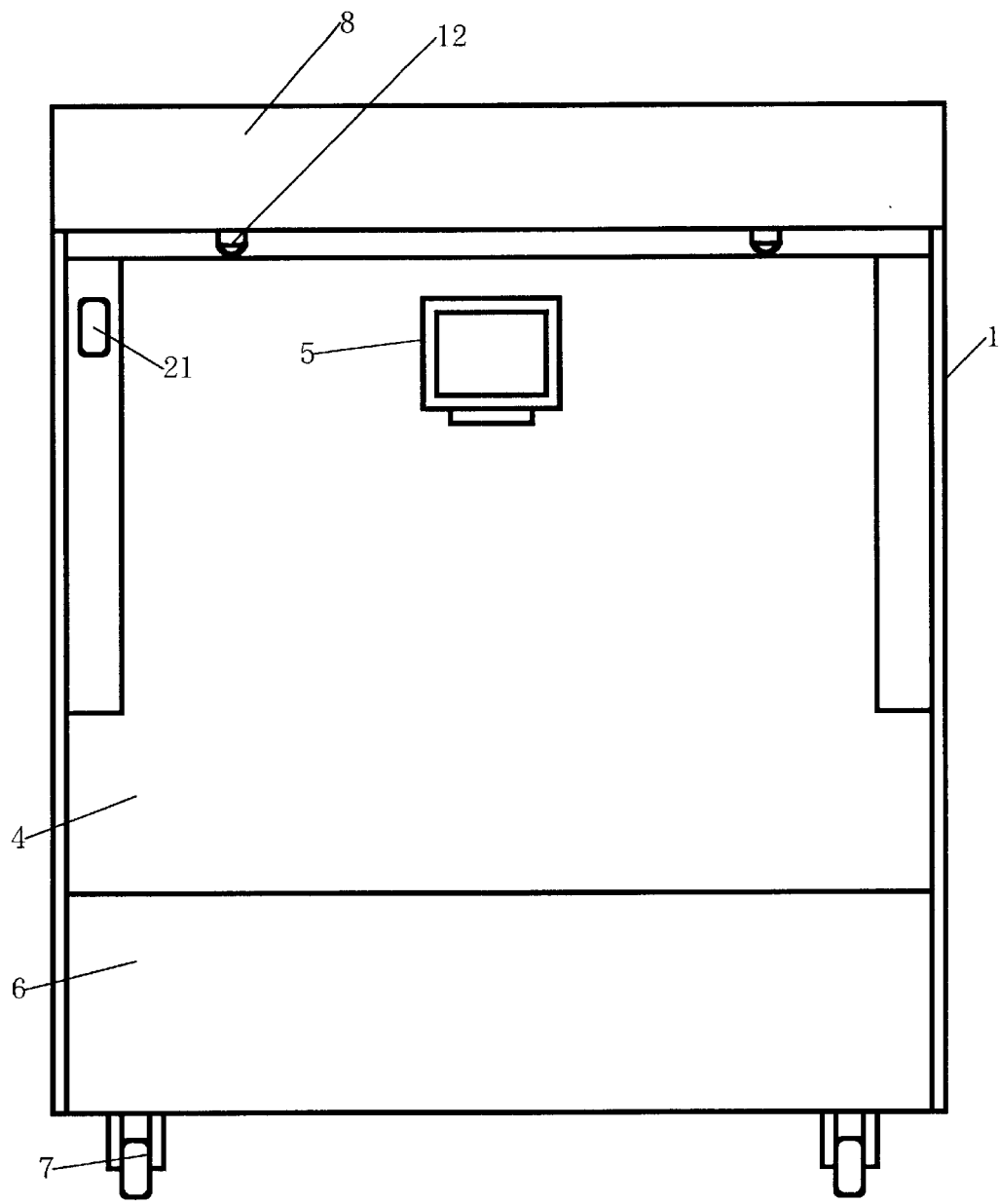
FIG. 2 is a front view of the garbage disposal machine in accordance with the first embodiment of the present invention.
Figure 3:
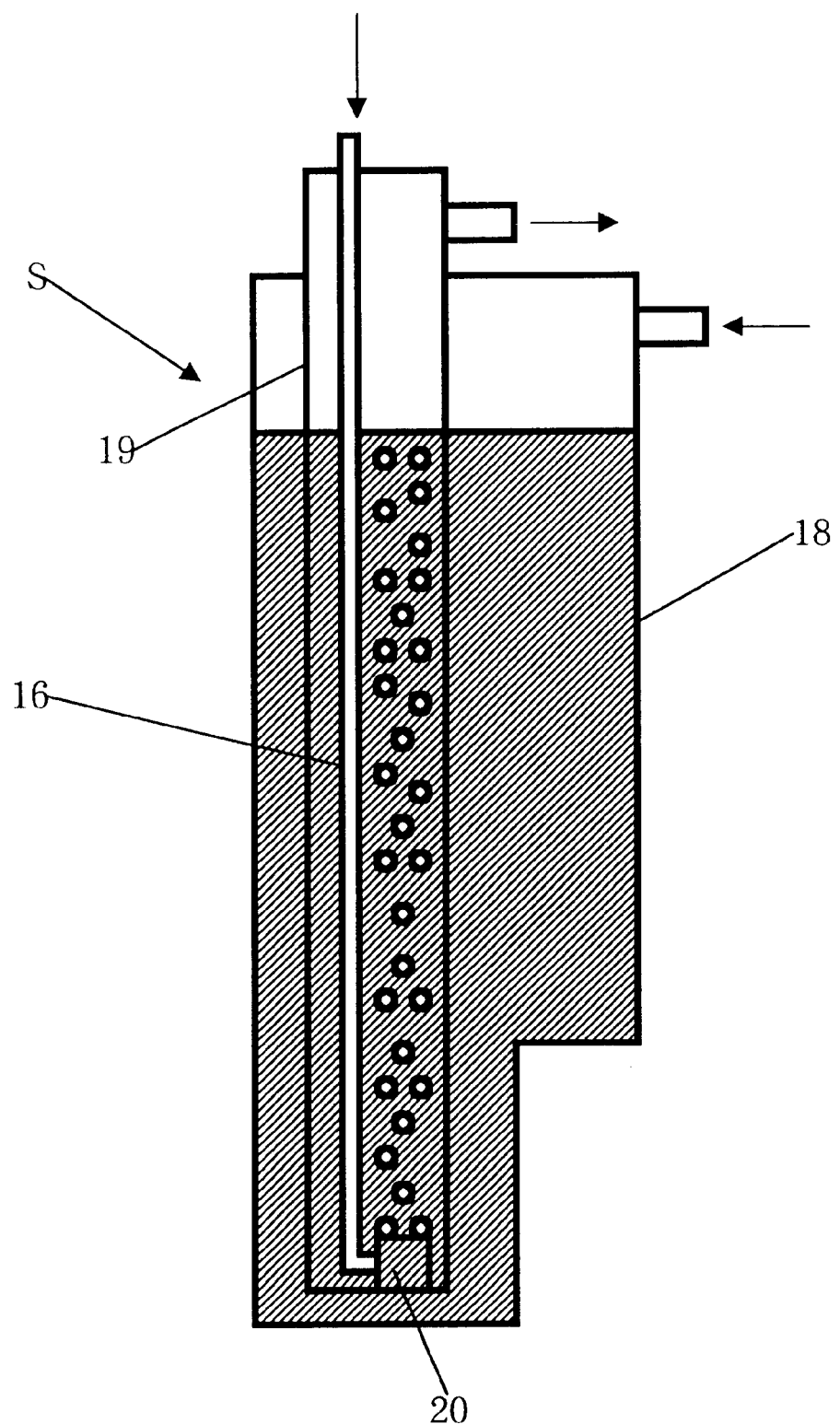
FIG. 3 is a drawing explaining the inside construction of the reodoring tank.

FIG. 1 is a side sectional view of the garbage disposal machine in accordance with the first embodiment of the present invention. FIG. 2 is a front view of the garbage disposal machine in accordance with the first embodiment of the present invention. FIG. 3 shows inner construction of the deodorization tank. FIG. 4(A) is a horizontal sectional view showing inside of the garbage disposal machine in accordance with the first embodiment of the present invention. FIG. 4(B) and FIG. 4(C) show the shutter movement. FIG.

Figure 6:
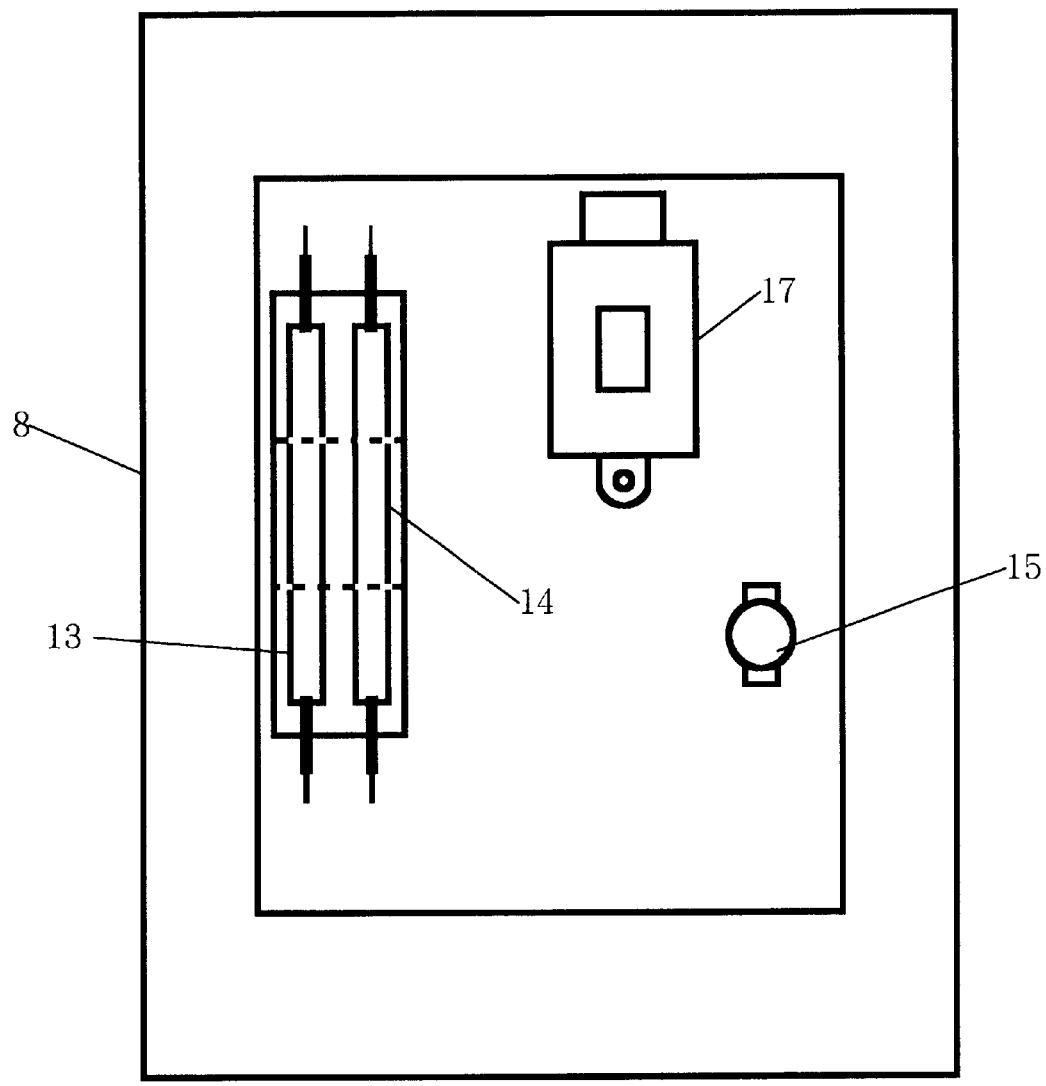
FIG. 6 is a bottom view, which shows inside of the lid part of the garbage disposal machine in accordance with the first embodiment of the present invention.
Figure 7:
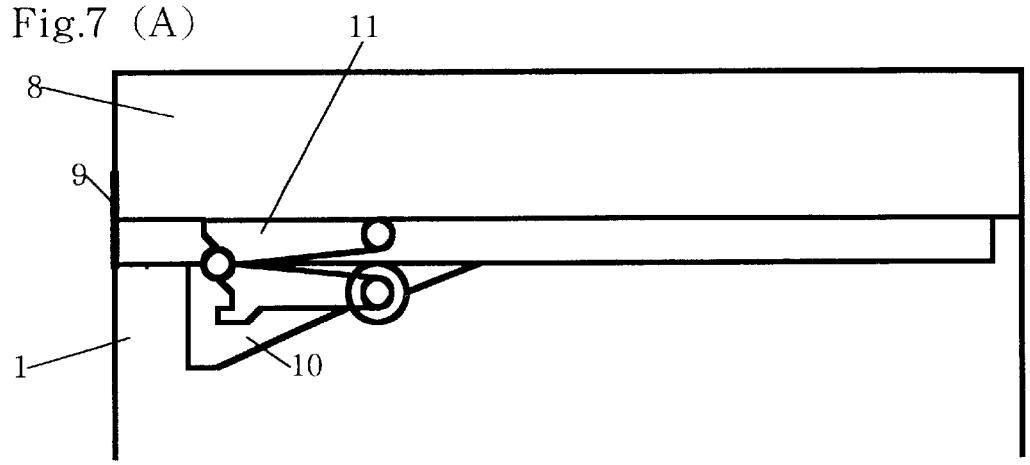
FIG. 7(A) to (C) are the drawings for explanation of the open-close movement of the lid part of the garbage disposal machine in accordance with the first embodiment of the present invention.
Figure 7:
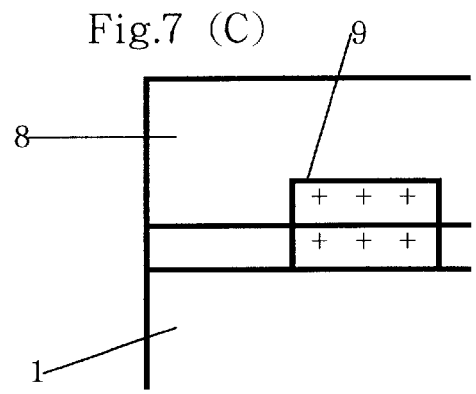
Figure 7:
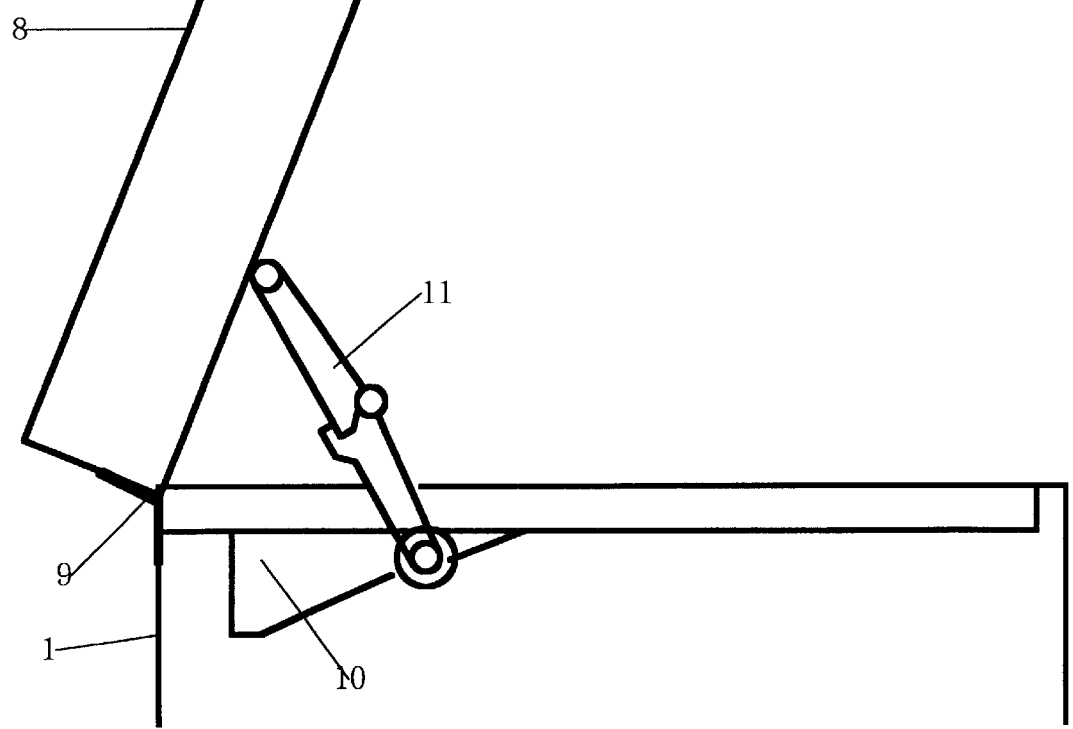
Figure 8:
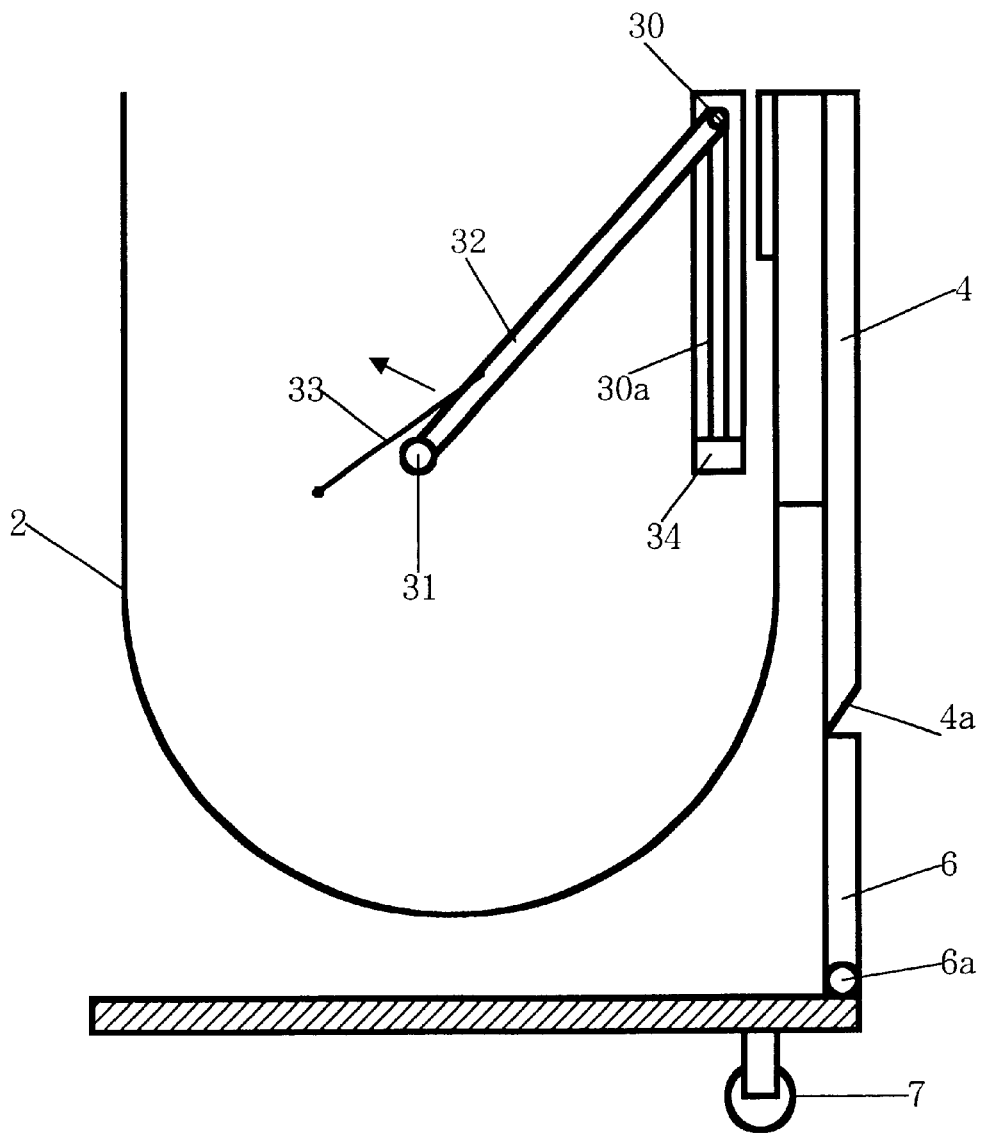
FIG. 8 is a drawing for explaining the construction of inclination angle adjustment of the disposal tub (at normal position)
Figure 9:
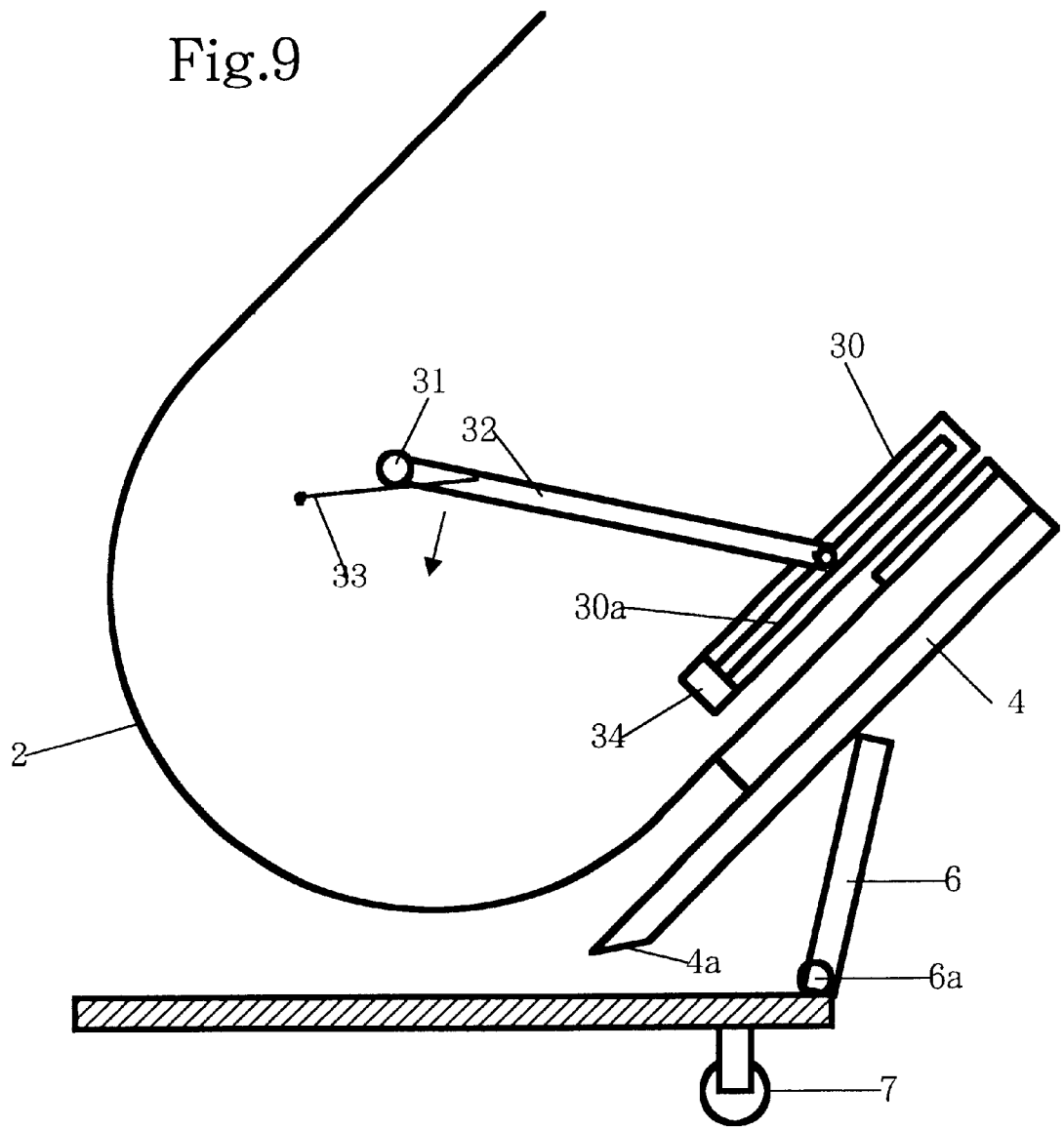
FIG. 9 is a drawing for explaining the construction of inclination angle adjustment of the disposal tub (at 45 degrees inclined position)
Figure 10:
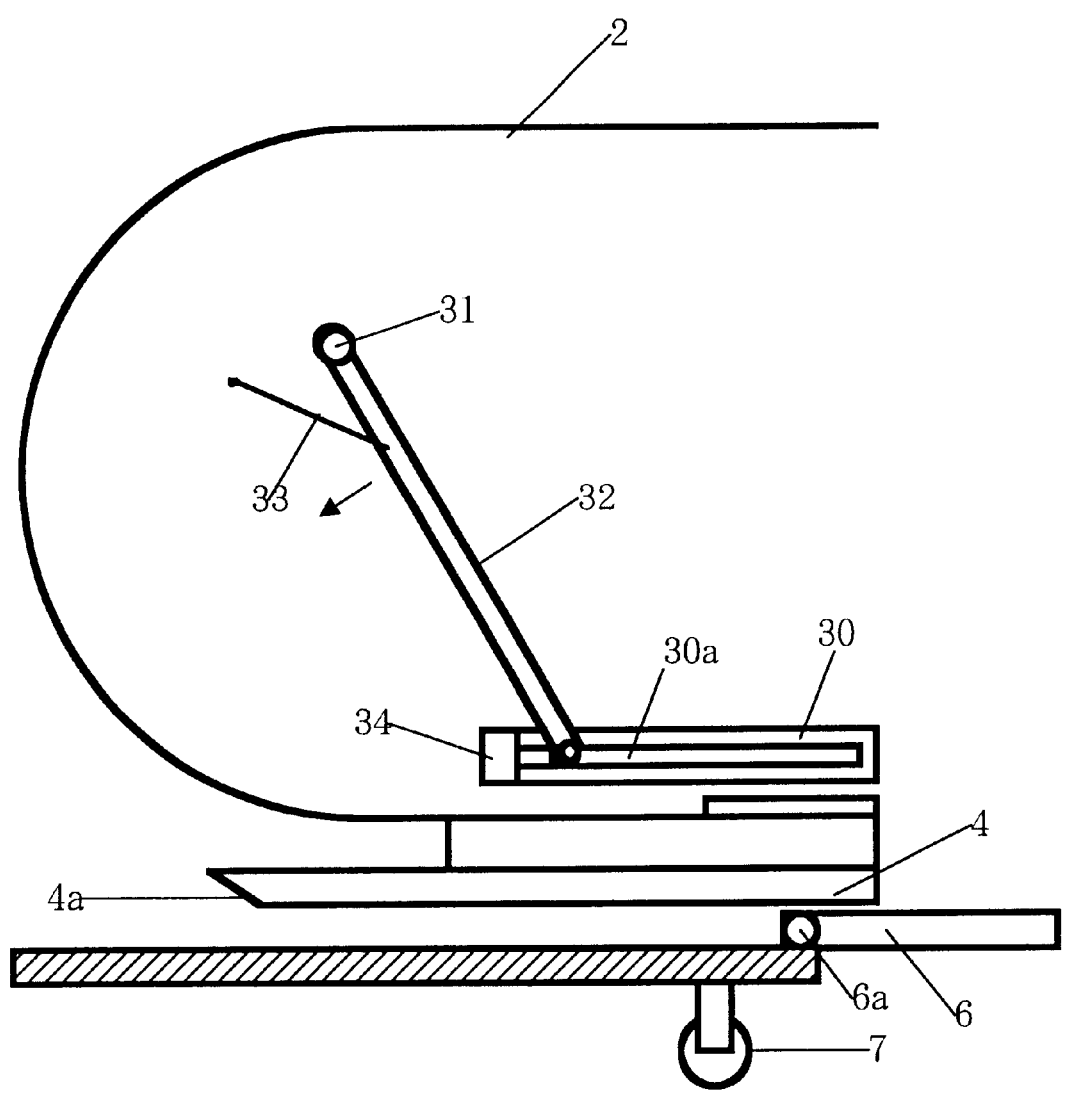
FIG. 10 is a drawing for explaining the construction of inclination angle adjustment of the disposal tub (at 90 degrees inclined position)
Figure 11:
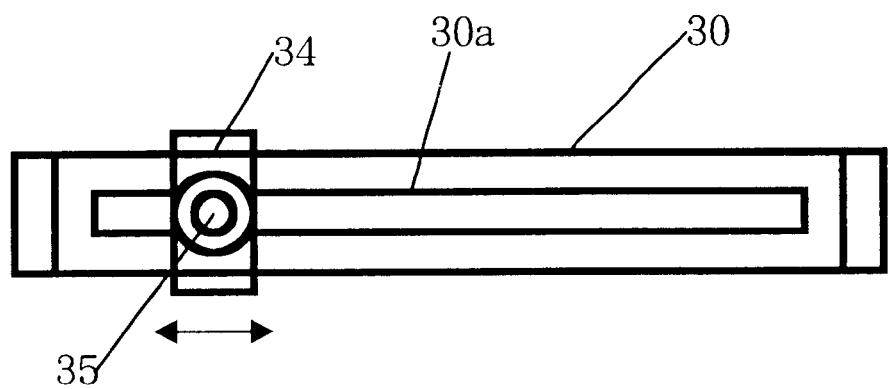
FIG. 11(A) is a top plan view of the guide part.
FIG. 11(B) is a side view of the guide part.
Figure 11:
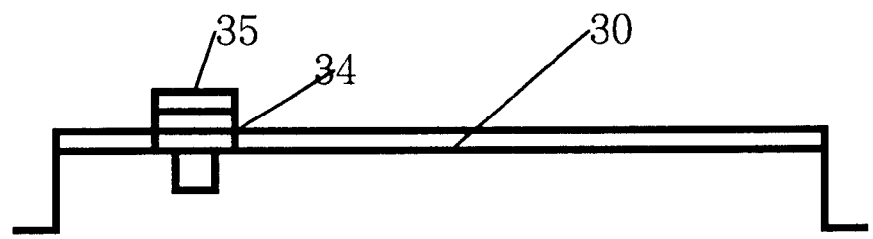

5 is a side sectional view for explanation of a method of driving the agitating blades in accordance with the first embodiment of the present invention. FIG. 6 is a bottom view showing inside of the lid part in accordance with the first embodiment of the present invention. FIG. 7(A) to FIG. (C) show open-close movement of the lid part in accordance with the first embodiment of the present invention. FIG. 8 to FIG. 10 show the construction of inclination angle adjustment in accordance with the disposal tub. FIG. 11 (A) is a horizontal view of the guide part and FIG. 11(B) is a side view of the guide part.

The garbage disposal machine in accordance with the first embodiment of the present invention has a body 1 of box shape, a disposal tub 2 which is supported to be rotated in the body 1 and into which garbage and garbage decomposing material like wood chips and the like for decomposing garbage are put, and agitating blades 3 for agitating garbage and garbage disposal materials in the disposal tub 2.

In the front side of the body 1, there is a front door 4 fixed to the side wall of the disposal tub 2. The front door 4 has a handle 5 for pulling the door to this side (see FIG. 2). An open-close door 6 is provided at the lower part of the front door 4. The open-close door 6 can be rotated by the support of a spindle 6a provided at the bottom edge of the body 1 as fulcrum (see FIG. 8). When the front door 4 is inclined up to the designated angle, it hits the open-close door 6, which will incline (see FIG. 9 and FIG. 10). Furthermore, the spindle 6a has a revolving spring which urges the open-close door 6 back to closing position (vertical position). Besides, at lower part of the front door 4 an inclining part 4a is formed, which enables smooth contact between the front door 4 and the open-close door 6.

At the bottom of the body 1, moving casters 7 are provided at 4 places for smoother movement.

At the upper part of the boy 1, a lid part 8 is fixed by means of hinges 9 (see FIG. 7C), which enables said lid part 8 to be opened or closed. The lower part of the lid part 8 is attached to and supported by the supporting tool 11, which can be folded and is attached to a bracket 10 at the higher part of the body 1 (see FIGS. 7(A) and (B)). Also as shown in FIG. 2, the lid part 8 may be fixed to the body 1 by a latch 12 which is fixed at the edge of the lid part 8. Thus the lid part 8 may be prevented from being kept opened. The lid part 8 is usually closed although it may be opened during maintenance.

Inside the lid part 8, a heater 13 and a fan 14 are installed, which constitute warm air induction means, in order to heat up the garbage by inducing warm air, to circulate the gas developed in the process of garbage decomposing in the disposal tub 2, and to resend the gas into the disposal tub 2. In the body 1, a temperature detection part (for example thermocouple) is installed to detect the temperature in the disposal tub 1, and to regulate the temperature setting of the heater 13 and the rotation speed of the fan 14.

Furthermore, the lid part 8 has a lamp 15 attached to illuminate inside of the disposal tub 2 of the body 1. The lamp 15 is controlled to automatically illuminate when the front door 4 of the body 1 is opened.

Additionally, the lid part 8 has an exhausting pump 17, which constitutes the gas exhausting means, in order to exhaust part of the gas circulated into the exhausting pipe 16 by the fan 14. The exhausting pipe 16 is connected to a deodorizing part S, which deodorizes the gas in the exhausting pipe 16. The gas is exhausted by means of the exhausting pump 17 and ejects the gas to the outside.

The deodorizing part S installed in the body 1 has, as shown in FIG. 3, a deodorization tank 18 filled with deodorant and installed on a base seat K (see FIG. 1), a cylinder-like intermediate case 19 located in the deodorization tank 18, and the pumice-like air stone 20 which is put in the intermediate case 19 and connected to the end of the exhausting pipe 16. The deodorant is injected into the deodorization tank from a case filled with deodorant, which is not shown in the drawing, by inserting an injection tool to an inlet port 21 (see FIG. 2) configured at the front side of the body 1 through the inlet port 21 and an injection pipe 23.

The gas exhausted by the exhausting pump 17 is sent into the intermediate case 19 in the deodorization tank 18 by means of the exhausting pipe 16. The gas comes upward in the shape of bubbles with the malodor sealed in the bubble arising from the air stone 20 which is connected to the end of the exhausting pipe 16. Thereafter the gas is ejected to outside through the ejection pipe 24 from the outlet port 25 installed in the body 1.

Figure 4:
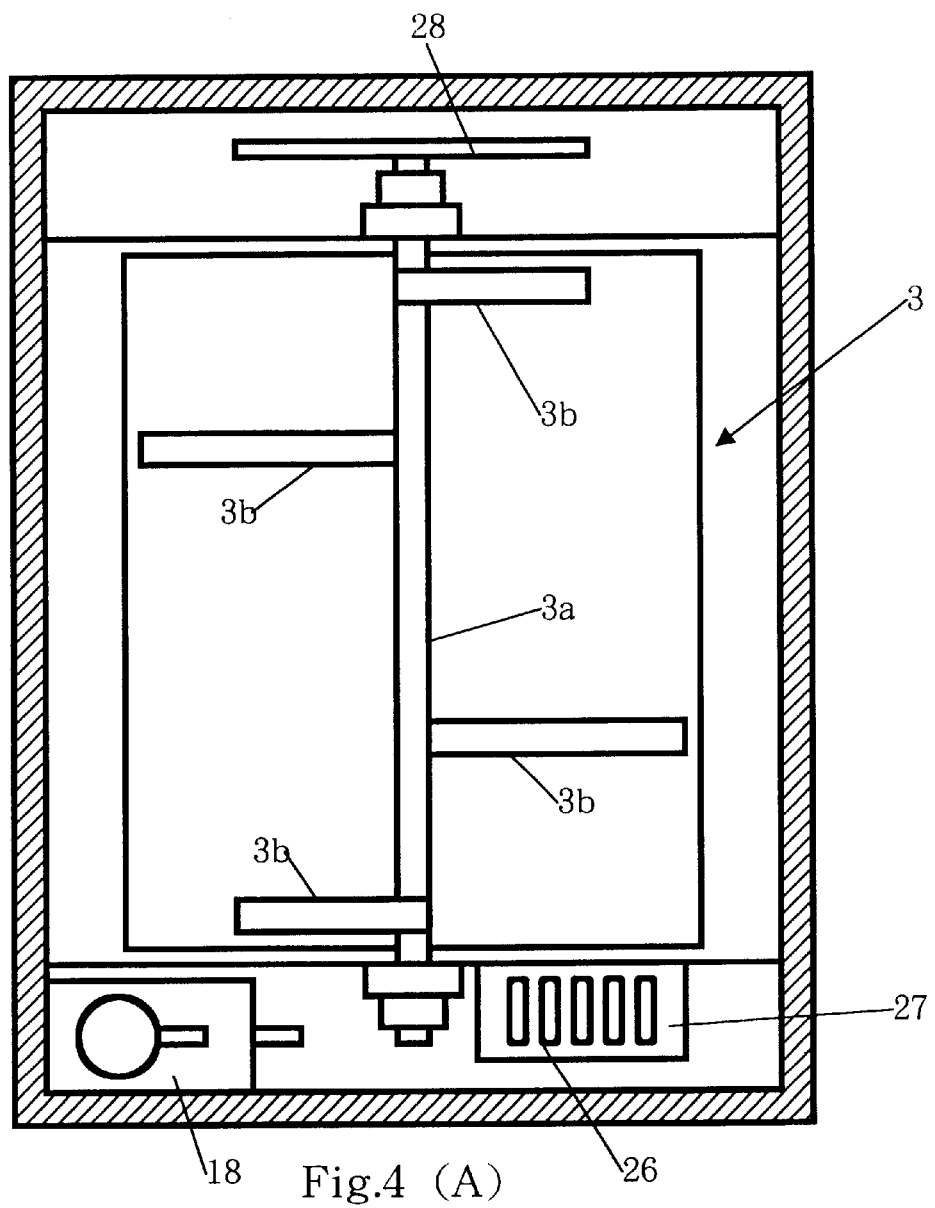
FIG. 4(A) is a top plan sectional view, which shows the inside of the body of the garbage disposal machine in accordance with the first embodiment of the present invention.
FIG. 4(B) and FIG. 4(C) are drawings for explanation of the shutter movement.
Figure 4:
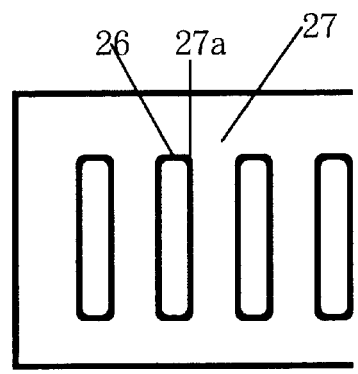
Figure 4:
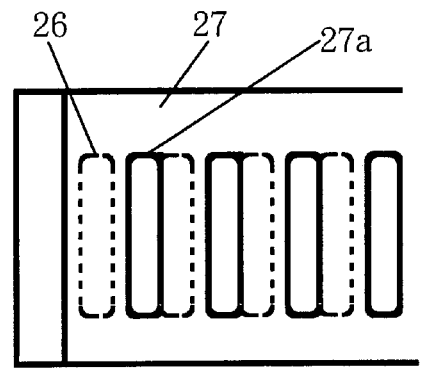

In the body 1, an outdoor air induction window 26 is provided in order to induce outdoor air into the body, and a shutter 27, which is able to slide, is installed to open or close th outdoor air induction window 26 (see FIG. 4 (A)). The shutter 27 has openings 27a at the locations corresponding to the outdoor air induction window 26. When the openings 27a of the shutter 27 and the outdoor air induction window 26 match, outdoor air can flow in (see FIG. 4 (B)), and when the outdoor air induction window 26 is closed by the shutter 27, the flow of outdoor air can be stopped (see FIG. 4 (C)). For example, in summer when outdoor air temperature is high, the outdoor air induction window 26 is opened to induce fresh outdoor air, while in winter when outdoor air temperature is low, the outdoor air induction window is closed. In this way, the volume of outdoor air induction is controlled by the shutter 27, and the temperature in the disposal tub 2 can be adjusted.

Figure 5:
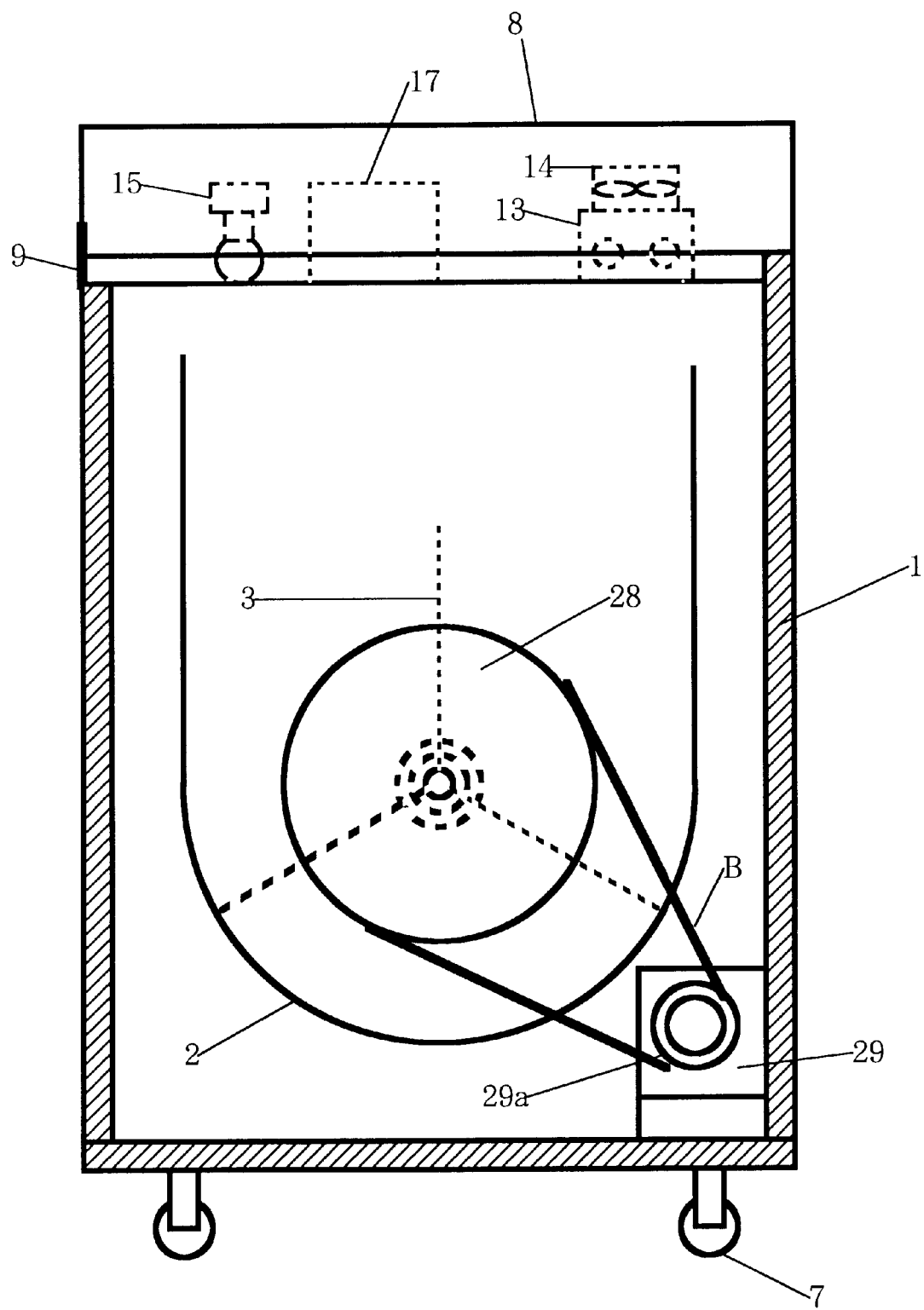
FIG. 5 is a side sectional view for driving method explanation of the agitating blades of the garbage disposal machine in accordance with the first embodiment of the present invention.

As shown in FIG. 1, FIG. 4 and FIG. 5, agitating blades 3 have a rotation shaft 3a supported in the body 1 and a plurality of rabbles 3b positioned with proper distance toward the axial direction of the rotating shaft 3a. Each of the rabbles 3b is fixed at an angle more than 90 degrees (preferably about 120 degrees) open to the adjacent rabble 3b. Accordingly, the garbage or garbage disposal materials failed to be scooped can be scooped again by the adjacent rabble 3b, which enables even and higher efficiency agitation.

At the end of the rotation shaft 3a of the agitation blades 3, a supporting roll 28 is fixed (see FIG. 5). At the bottom of the body 1, a driving motor 29 is installed. A driving roll 29a of the driving motor 29 and the supporting roll 28 are combined by winding a belt B. When the driving motor 29 is driven, the rotating power of the driving roll 29a is transferred to the supporting roll 28 by the belt B, which rotates the agitating blades 3.

Next, the angle adjustment mechanism of the disposal tub 2 is described with reference to FIG. 8 to FIG. 11. Angle adjustment mechanism of the disposal tub 2 includes a guide part 30, mounted in the disposal tub 2, with the elongated guide opening 30a configured, a coupling lever 32 mounted in a manner allowed to rotate by the support of a spindle 31 configured in the body 1 as fulcrum, and also mounted in a manner allowed to move, rubbing along the guide opening 30a in the guide part 30, a pulling spring 33 (an urging member) fixed between the body 1 and the coupling lever 32 which pulls the coupling lever 32, and a stopper 34 fixed in the guide opening 30a of the guide part 30 which regulates the rubbing location of the coupling lever 32.

The stopper 34, as shown in FIG. 11, can be moved rubbing along the guide opening 30a of the guide part 30 and can be fixed at the desired location of the guide opening 30a by means of a screw 35.

When the disposal tub 2 is in the normal position, the end of the coupling lever 32 is located at the upper end of the guide opening 30a of the guide part 30 (see FIG. 8).

When the front door 4 is opened and inclined, the disposal tub 2 is also inclined together. In case the inclination angle is within the designated angle, the pulling spring 33 urges the coupling lever 32 to the effect that the disposal tub 2 would return to the normal position.

In case the inclination angle of the disposal tub 2 is over the designated angle, the pulling spring 33 urges the coupling lever 32 to the effect that the disposal tub 2 would be at the inclined position (see FIG. 9 and FIG. 10).

The disposal tub 2 can be inclined to the extent that the end of the coupling lever 32 would locate at the lower end of the guide opening 30a of the guide part 30. However, by changing the location of the stopper 34, the rubbing location of the coupling lever 32 can be regulated. By this way, the position of the disposal tub 2 can be adjusted to remain inclined at the desirable angle.

Besides, from the viewpoint of stability in movement, it is preferable to install the angle adjustment mechanism of said disposal tub 2 at both sides of the side wall of the disposal tub 2.

Next, the movement of the garbage disposal machine in accordance with the first embodiment of the present invention is described. At first, the front door 4 is pulled to this side by means of the handle 5 and the disposal tub 2 is inclined. The inclination angle of the disposal tub 2 can be adjusted by moving the stopper 34.

Then, the garbage and garbage disposal materials are pulled into the disposal tub 2 and the front door 4 is closed again.

Then, the driving motor 29 is driven to rotate the agitating blades 3 in the disposal tub 2, which agitates garbage and garbage disposal materials and accelerates decomposition of the garbage. Also, by means of the heater 13 and the fan 14, warm air is induced into the disposal tub 2, which adjusts the temperature of garbage decomposition. The fan 14 circulates the gas developed in the process of garbage decomposing and resends the gas into the disposal tub 2.

Also, part of the gas circulated by the fan 14 is exhausted by means of the exhausting pump 17 to the exhausting pipe 16. The gas exhausted by the exhausting pump 17 is sent into the intermediate case 19 in the deodorization tank 18 by means of the exhausting pipe 16. Then, after coming up in a state with the malodor sealed in the bubbles arising from the air stone 20 connected to the end of the exhausting pipe 16, the gas is ejected to outside by means of the ejecting pipe 24 from the outlet port 25 installed in the body 1.

Then, the disposal tub 2 is inclined by pulling the front door 4 using the handle 5, and the dunghill remaining after completing garbage decomposing process is discharged. Also, the inside of the disposal tub 2 is properly cleaned up.

The garbage disposal machine in accordance with the first embodiment of the present invention offers the advantage of reducing the consumption of electric power and saving energy, because the gas developed in the process of garbage decomposing is, after circulated, utilized again.

Figure 12:
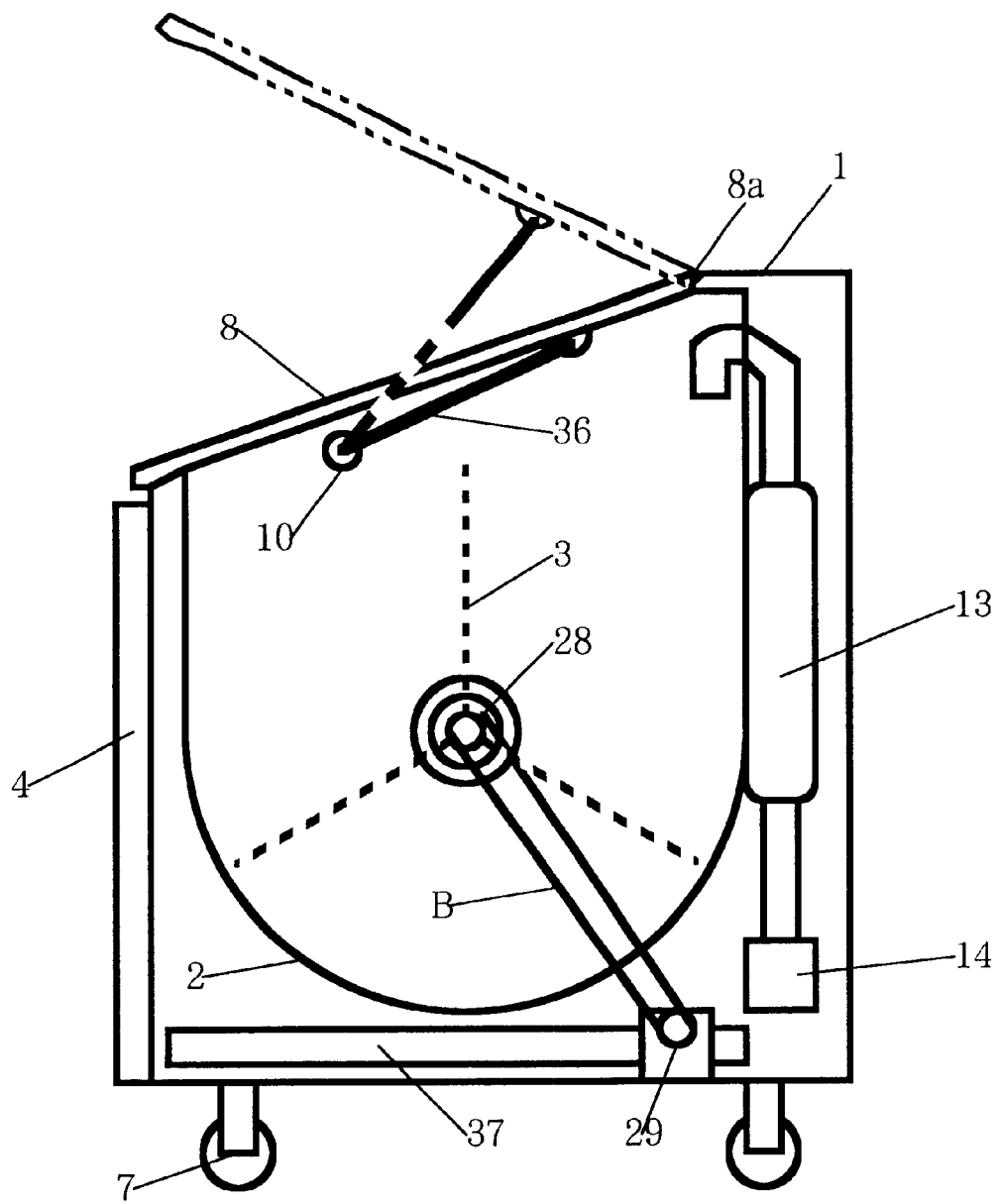
FIG. 12 is a side sectional view of the garbage disposal machine in accordance with the second embodiment of the present invention.
Figure 13:
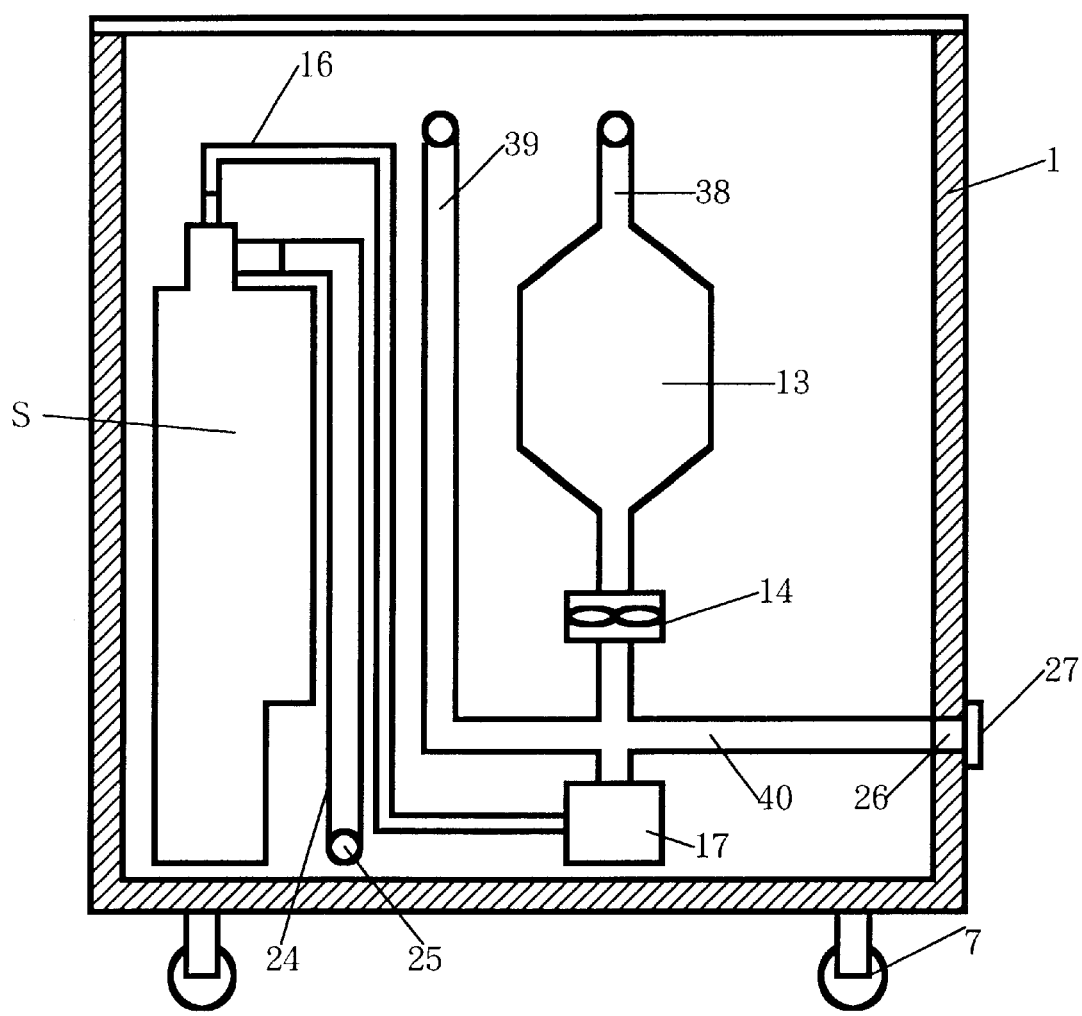
FIG. 13 is a rear sectional view of the garbage disposal machine in accordance with the second embodiment of the present invention.
Figure 14:
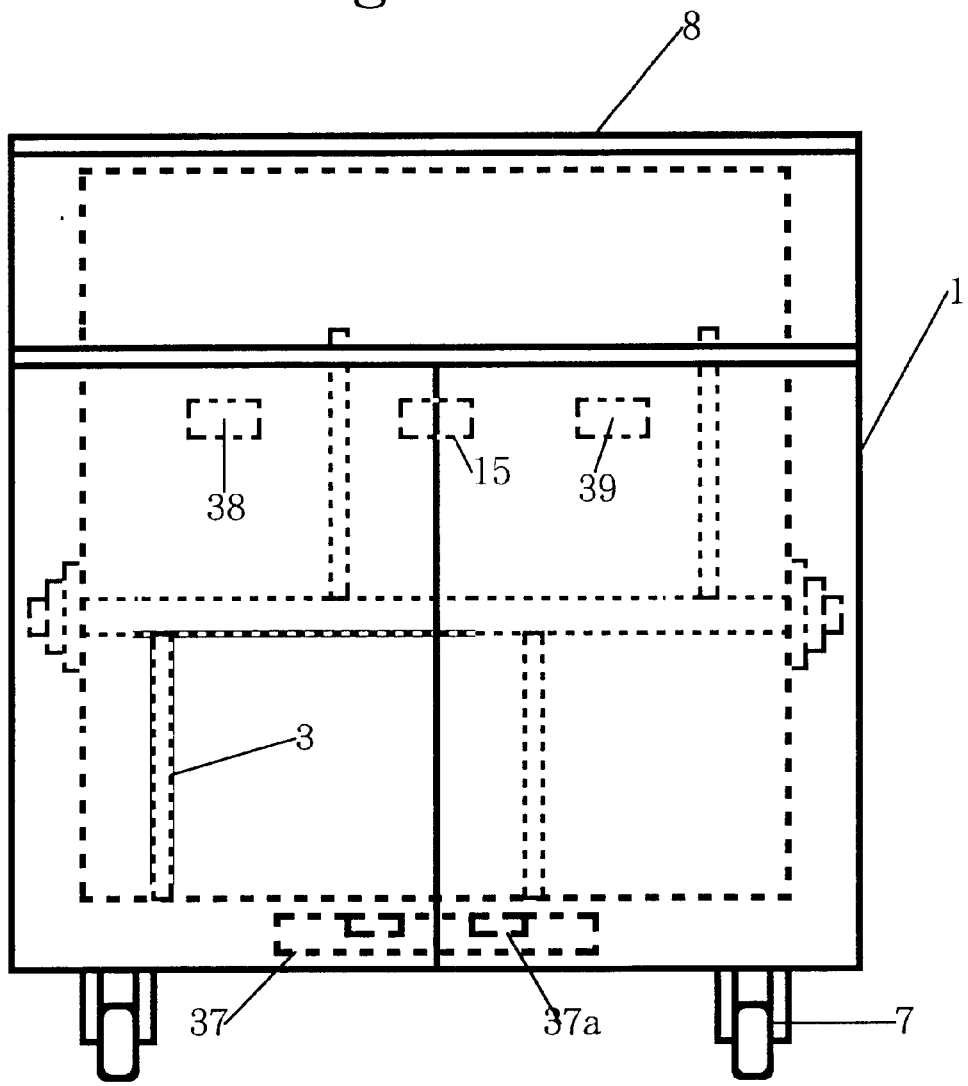
FIG. 14 is a front view of the garbage disposal machine in accordance with the second embodiment of the present invention.
Figure 15:
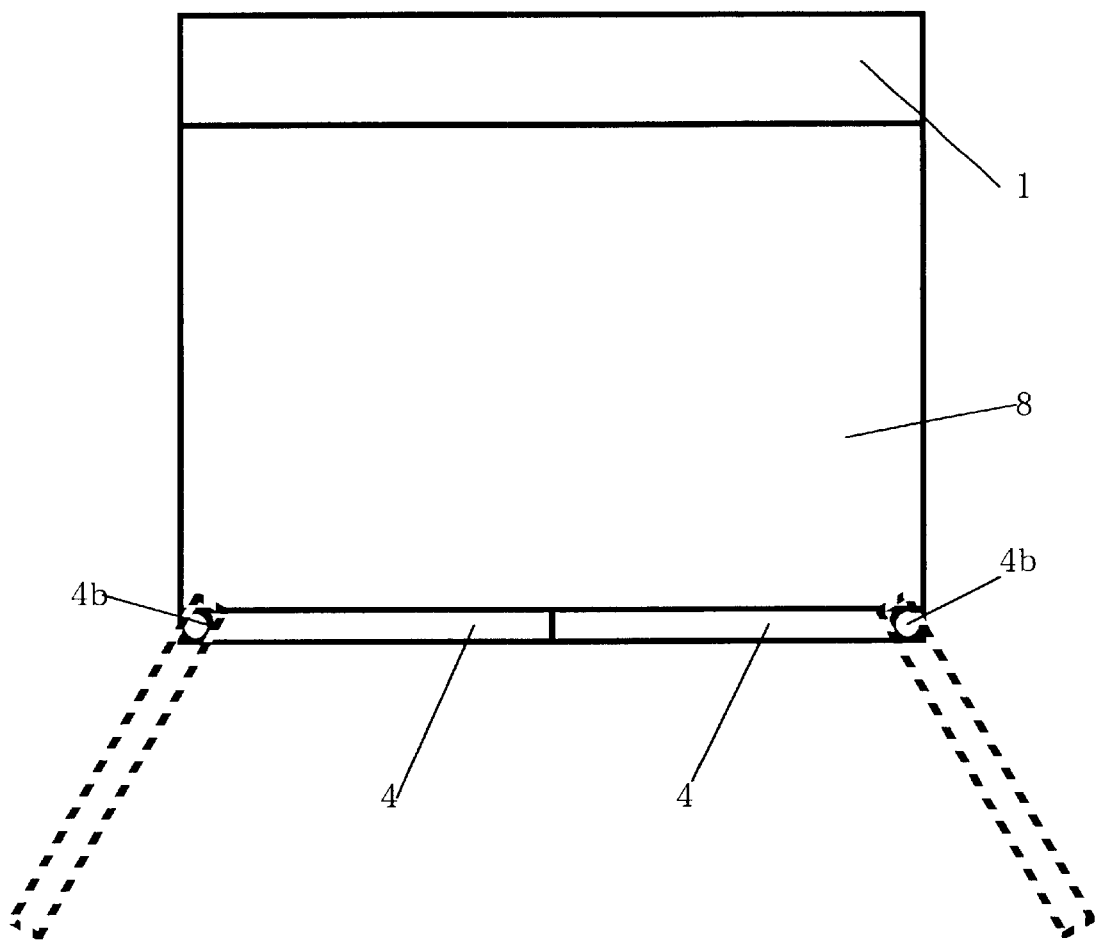
FIG. 15 is a top plan view of the garbage disposal machine in accordance with the second embodiment of the present invention.

Also, the first embodiment of the present invention offers further advantage of easy handling in putting in or ejecting garbage and cleaning up inside of the disposal tub 2, because the disposal tub 2 can be adjusted to incline at the desirable angle, FIG. 12 is a side view in section of the garbage disposal machine in accordance with the second embodiment of the present invention. FIG. 13 is a rear view in section of the garbage disposal machine in accordance with the second embodiment of the present invention. FIG. 14 is a front view of the garbage disposal machine in accordance with the second embodiment of the present invention. FIG. 15 is a top view of the garbage disposal machine in accordance with the second embodiment of the present invention.

The garbage disposal machine in accordance with the second embodiment of the present invention has a body 1 of box shape, a disposal tub 2 supported and fixed in the body 1 to put in garbage and garbage disposal materials like wood chip for decomposing garbage, and agitating blades 3 to agitate garbage and garbage disposal materials in the disposal tub 2.

At both ends of the front side of the body 1, one pair of front doors 4 are provided which can be opened and closed by the support of a spindle 4b as fulcrum (see FIG. 15).

At the bottom of the body 1, casters 7 are mounted at 4 places for smoother movement of the unit.

In upper portion of the body 1, a lid part 8 is installed which can be opened and closed by the support of a spindle 8a as fulcrum. The lower part of the lid part 8 is supported by attaching to a damper 36 that is attached to a bracket 10 installed in the body 1, which enables the lid part 8 to be easily opened or closed.

Inside the body 1, a lamp 15 is attached to illuminate inside of the disposal tub 2 of the body 1 (see FIG. 14). The lamp 15 is controlled to automatically illuminate when the front door 4 of the body 1 is opened.

At the lower part inside the body 1, a tray 37 is installed to impound the used garbage disposal materials like wood chip and the like. The tray 37 has a pulling handle 37a (see FIG. 14), and by pulling the handle 37a to this side, the used garbage disposal materials can be scrapped.

The construction and the driving method of agitating blades 3 is the same as those of the first embodiment.

Inside the body 1 at the rear side, as shown in FIG. 13, a heater 13 and a fan 14 is installed as the warm air induction means, which induces warm air into the disposal tub 2 by means of an inducing pipe 38, circulates the gas developed in the process of garbage decomposing in the disposal tub 2 by means of a sending pipe 39, and resends the gas into the disposal tub 2. In the body 1, a temperature detection part (for example thermocouple) is installed, which detects the temperature in the disposal tub 2, and regulates the temperature setting of the heater 13 and the rotation speed of the fan 14.

In addition, inside the body 1, an exhausting pump 17 is installed as the exhausting means, which exhausts part of the gas circulated by the fan 14 into an exhausting pipe 16. The exhausting pipe 16 is connected to a deodorizing part S, which deodorizes the gas in the exhausting pipe 16 exhausted by the exhausting pump 17 and ejects the gas to outside. This deodorizing part S is similar to that of the first embodiment.

The gas exhausted by means of the exhausting pump 17 is, after deodorized through the deodorizing part S, ejected to outside by means of an ejection pipe 24 from an outlet port 25 which is configured in the body 1.

Also, the body 1 has an outdoor air induction window 26, and the outdoor air induction window 26 and the fan 14 are connected by an outdoor air induction pipe 40. The outdoor air induction window 26 is installed with a shutter 27 that can slide, which is explained in the case of The first embodiment. By means of this shutter 27, the volume of outdoor air induction and the temperature inside the disposal tub 2 can be adjusted.

The garbage disposal machine in accordance with the second embodiment of the present invention offers the advantage of reducing power consumption and saving energy, because the gas developed in the process of garbage decomposing is circulated and utilized again.

The present invention is not limited to the aforementioned embodiment, but may be carried out in any of various other forms without departing from the spirit and scope of the invention as defined by the appending claims.

What is claimed is:

1. A garbage disposal machine comprising:

a body;

a disposal tub installed in said body for receipt of garbage and garbage disposal materials that decompose the garbage;

a guide part supported in said body to be rotated, mounted in said disposal tub, and having a guide opening;

a coupling lever mounted in a manner allowed to rotate by the support of a spindle provided in said body as a fulcrum, and also allowed to move rubbing along the guide opening of said guide part, an urging member installed between said body and said coupling lever, which is designed to pull said coupling lever so that said disposal tub will return to a normal position when it is inclined within a designated angle, and said disposal tub will move to an inclined position when it is inclined more than the designated angle;

a stopper fixed in said guide part to regulate the rubbing location of said coupling lever;

agitating means for agitating garbage and garbage disposal materials in said disposal tub;

warm air induction means for inducing warm air into said disposal tub, circulating the gas developed in the process of garbage decomposing in said disposal tub and resending the gas into said disposal tub;

gas exhausting means for exhausting part of the gas circulated by the warm air induction means through an exhausting passage; and deodorization means for deodorizing the gas in said exhausting passage exhausted by said gas exhausting means and ejecting the gas to the outside.

2. The garbage disposal machine according to claim 1, further comprising:

an outdoor air induction window formed in said body; and a shutter to adjust the volume of outdoor air to be aspirated through said outdoor air induction window.

3. The garbage disposal machine according to claim 1, wherein:

said agitating means has a rotation shaft and a plurality of rabbles that are positioned with proper distance toward the axial direction of said rotation shaft with each of said rabbles fixed more than 90 degrees open to the adjacent rabble.

4. The garbage disposal machine according to claim 1, wherein:

said deodorization means includes a deodorization tank filled with deodorant liquid.

* * * * *